(12) United States Patent
Yoshida et al.

(10) Patent No.: US 7,244,204 B2
(45) Date of Patent: Jul. 17, 2007

(54) HYDRAULIC TENSIONER

(75) Inventors: Osamu Yoshida, Osaka (JP); Hiroshi Hashimoto, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 572 days.

(21) Appl. No.: 10/846,378

(22) Filed: May 14, 2004

(65) Prior Publication Data

US 2004/0266572 A1   Dec. 30, 2004

(30) Foreign Application Priority Data

Jun. 30, 2003   (JP) .............................. 2003-187277

(51) Int. Cl.
*F16H 7/08*   (2006.01)
*F16H 7/22*   (2006.01)

(52) U.S. Cl. ...................... 474/110; 474/109

(58) Field of Classification Search ........ 474/109–110, 474/111, 140, 101; 137/533.11, 539, 325, 137/533.19
See application file for complete search history.

(56) References Cited

U.S. PATENT DOCUMENTS

| 4,504,251 A | * | 3/1985 | Mittermeier ................ 474/110 |
| 4,792,322 A | | 12/1988 | Goppelt et al. |
| 5,700,214 A | * | 12/1997 | Kuznets et al. ............. 474/110 |
| 5,971,015 A | * | 10/1999 | Gonsior ................. 137/533.11 |
| 6,086,497 A | | 7/2000 | Fukuda et al. |
| 6,139,454 A | * | 10/2000 | Simpson ..................... 474/110 |
| 6,471,612 B2 | * | 10/2002 | Nakakubo ................... 474/110 |
| 6,811,505 B2 | * | 11/2004 | Hashimoto et al. ......... 474/110 |
| 2001/0016530 A1 | * | 8/2001 | Grunke et al. .............. 474/110 |

FOREIGN PATENT DOCUMENTS

| EP | 0 919 744 A1 | | 6/1999 |
| EP | 1 223 364 A1 | | 7/2002 |
| JP | 2854261 | | 11/1998 |
| JP | 2000-136860 | | 5/2000 |
| JP | 2000-161453 A | * | 6/2000 |
| JP | 2002-206603 | | 7/2002 |
| JP | 2002-276747 A | * | 9/2002 |
| JP | 2003-056657 | | 2/2003 |

* cited by examiner

*Primary Examiner*—Marcus Charles
(74) *Attorney, Agent, or Firm*—Howson & Howson LLP

(57) ABSTRACT

In a hydraulic tensioner, a check valve assembly comprises a synthetic resin ball guide with a check ball movable therein. Oil grooves are provided in the wall of the ball guide, and minimum clearance is allowed between the ball and the wall of the ball guide. The ball is biased toward a metal ball seat formed as a separate element from the ball guide and attached to the ball guide by crimping portions of the synthetic resin of the ball guide over a flange of the seat, using heat fusion. A metal retainer disc, also a separate element, is similarly attached to the ball guide by crimping using heat fusion. A resilient annular lip is formed on the synthetic resin ball guide, and the assembly is press-fit into a plunger-receiving hole in a tensioner housing with the lip in engagement with the wall of the hole.

4 Claims, 5 Drawing Sheets

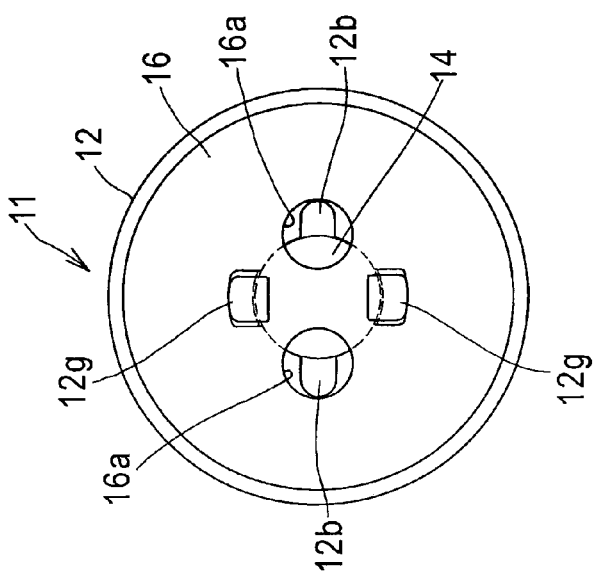
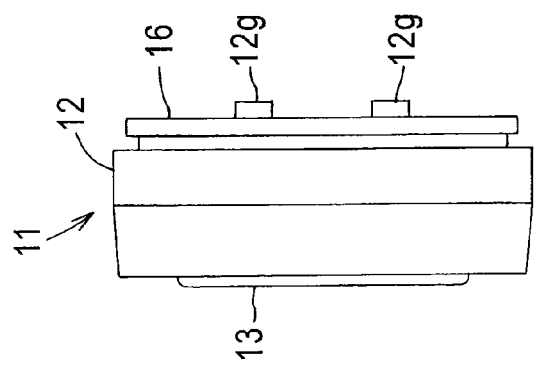
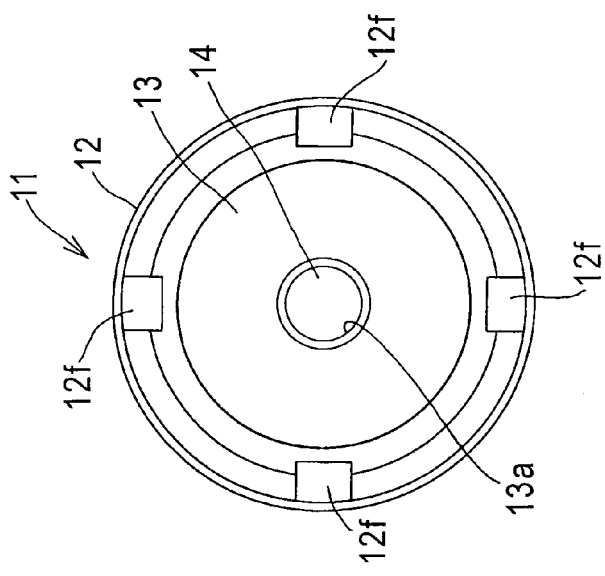

Fig.5(A)     Fig.5(B)     Fig.5(C)
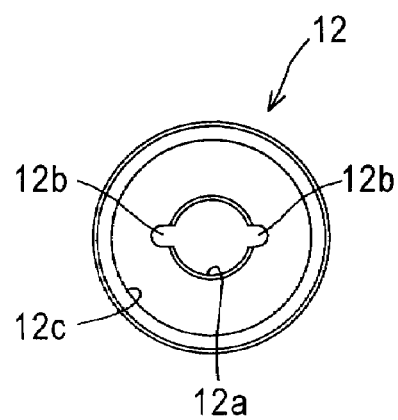 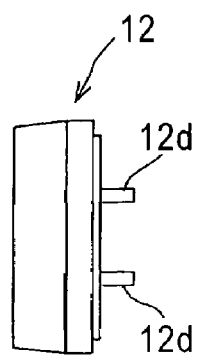 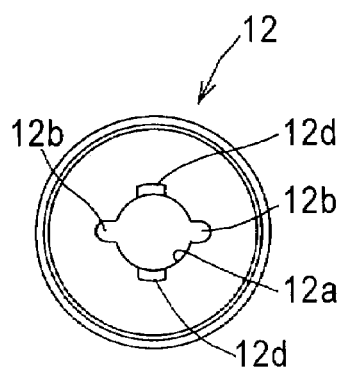
Fig.5(D)
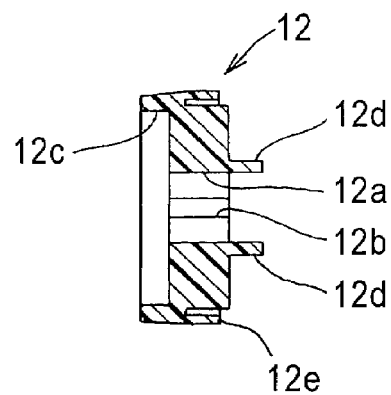

HYDRAULIC TENSIONER

FIELD OF THE INVENTION

This invention relates to a hydraulic tensioner having a check valve used for applying proper tension to, an endless flexible transmission medium, for example, a timing belt or a timing chain in an internal combustion engine of a vehicle.

BACKGROUND OF THE INVENTION

Hydraulic tensioners have been widely used with timing belts and timing chains that transmit rotation between the crankshaft and one or more camshafts in an internal combustion engine. The purpose of these tensioners is to suppress vibration generated during the travel of the timing belt or chain, and to maintain proper tension.

In a hydraulic tensioner, oil is typically introduced, through a one-way check valve, into a high pressure chamber formed by a housing and a plunger. In one proposed tensioner, described in Japanese Laid-Open Publication No. 2002-206603 (On page (2), column 1, lines 2to 6; on page (4), column 5, lines 4to 28; on page (6), column 9, lines 19to 34; and in FIG. 1) a metal cylinder is fitted to a cylindrical hole formed in a housing. A hollow plunger, which fits slidably into the cylinder, is urged in the protruding direction by a compression spring, which is in engagement with a bottom plate formed on the cylinder. An oil chamber is formed by cooperation of the inside of the plunger and the cylinder. The bottom plate has a central hole for the inward flow of oil. A reduced diameter cylindrical hole is provided at the bottom of the cylindrical hole of the housing, and a check valve mechanism is fitted into the reduced diameter cylindrical hole. The check valve mechanism is pre-assembled, and comprises a cylindrical block having an oil passage, a ball seat fitted into the cylindrical block, a check ball, a coil spring urging the check ball against the seat, and a lid holding the coil spring in place. Abutment of the upper part of the cylindrical block with the bottom plate formed on the metal cylinder holds the check valve mechanism in place in the housing.

The hydraulic tensioner disclosed in the above-mentioned Japanese Laid-Open Publication No. 2002-206603 has several problems. First, because, the ball seat is press-fit into the cylindrical block when the check valve mechanism is pre-assembled, the inner circumferential surface of the block and the outer circumferential surface of the ball seat must be machined to a high working accuracy. The requirement for accurate machining leads to a high manufacturing cost. Second, when the check valve assembly is incorporated into the housing, the force exerted by the compression spring on the bottom of the metal cylinder is depended upon to hold the check valve assembly in the reduced diameter cylindrical hole. The dependency on the force exerted by the compression spring to hold the check valve assembly in place gives rise to difficulties in the assembly of the tensioner.

Accordingly, among the objects of the invention are the solution to the above-mentioned problems, reduction in the manufacturing cost of a hydraulic tensioner having a check valve assembly, and simplification of the assembly of the tensioner.

SUMMARY OF THE INVENTION

The hydraulic tensioner in accordance with the invention comprises a housing having a plunger-receiving hole with an inner circumferential wall. A plunger slidably fits in the plunger-receiving hole and has one end protruding from the housing. A compression spring biases the plunger in the protruding direction. A high pressure oil chamber is defined by the plunger-receiving hole and the plunger, and a passage in the housing is provided for flow of oil from outside the housing into the oil chamber. A check valve assembly is incorporated into the housing, for allowing oil to flow through the passage into the oil chamber, but blocking reverse flow of oil through the passage. The check valve assembly comprises a check ball, a ball seat, a synthetic resin ball guide attached to the ball seat, the ball guide having a guide hole in which the check ball is movable toward and away from the ball seat, a biasing spring urging the check ball toward engaged relationship with the ball seat, and a retainer, attached to the synthetic resin ball guide, the biasing spring being disposed between the retainer and the check ball. The retainer limits movement of the check ball away from the ball seat. The guide hole has a wall with an inner circumferential surface and at least one groove is formed in the wall for permitting flow of oil past the check ball. The guide hole and the check ball have a clearance between them just sufficient to allow movement of the check ball in the guide hole into and out of engagement with the ball seat. The synthetic resin ball guide is press fit into the housing, and the check valve assembly is thereby incorporated into the housing.

Preferably, the synthetic resin ball guide is secured to the ball seat by at least one crimped portion of the ball guide, and the retainer is similarly secured to an end surface of the synthetic resin ball guide by at least one crimped portion of the ball guide.

The synthetic resin ball guide also preferably has an outer circumference with an annular lip formed thereon, the annular lip resiliently engaging the inner circumferential wall of the plunger-receiving hole of the tensioner housing.

The synthetic resin ball guide does not receive the impact of the check ball, and the ball seat and the retainer are members which are separate from the synthetic resin ball guide. The shapes of the ball seat and the retainer can be simplified. Moreover, the requirement for accuracy in the production of parts is reduced, assembly is easier, and, the overall manufacturing cost of the tensioner is reduced.

Since the clearance between the check ball and the check ball guide hole is the minimum necessary to allow the ball to move freely along the length of the guide hole, violent movement of the check ball is prevented, and the responsiveness of the check ball is enhanced.

Check valve assemblies having different check ball stroke lengths can be distinguished from one another by color coding, which is easily accomplished by the use of different resin colors for different ball guides.

Press-fitting of the synthetic resin ball guide into the tensioner housing body, by taking advantage of the elasticity of the synthetic resin, allows the check valve assembly to be incorporated easily into a hydraulic tensioner. The synthetic resin ball guide can be still more easily press-fit into the tensioner housing by taking advantage of the elasticity of an annular, outer circumferential lip formed on the synthetic resin ball guide, the annular lip being a characterizing feature of the invention. Moreover, the annular lip prevents leakage of oil through gaps between the check valve assembly and the tensioner housing.

Finally, utilization of crimping to mount the ball seat and/or the retainer to the synthetic resin ball guide enhances the ease of assembly of the check valve.

BRIEF DESCRIPTION OF THE DRAWINGS

FIGS. 4(A), 4(B), and 4(C) are respectively left side, front, and right side views of the check valve assembly as shown in FIG. 2;

FIGS. 5(A), 5(B), 5(C), and 5(D) are respectively left side, front, right side and sectional views of a synthetic resin ball guide which constitutes a part of the check valve assembly;

DETAILED DESCRIPTION OF THE PREFERRED EMBODIMENTS

Figure 1:
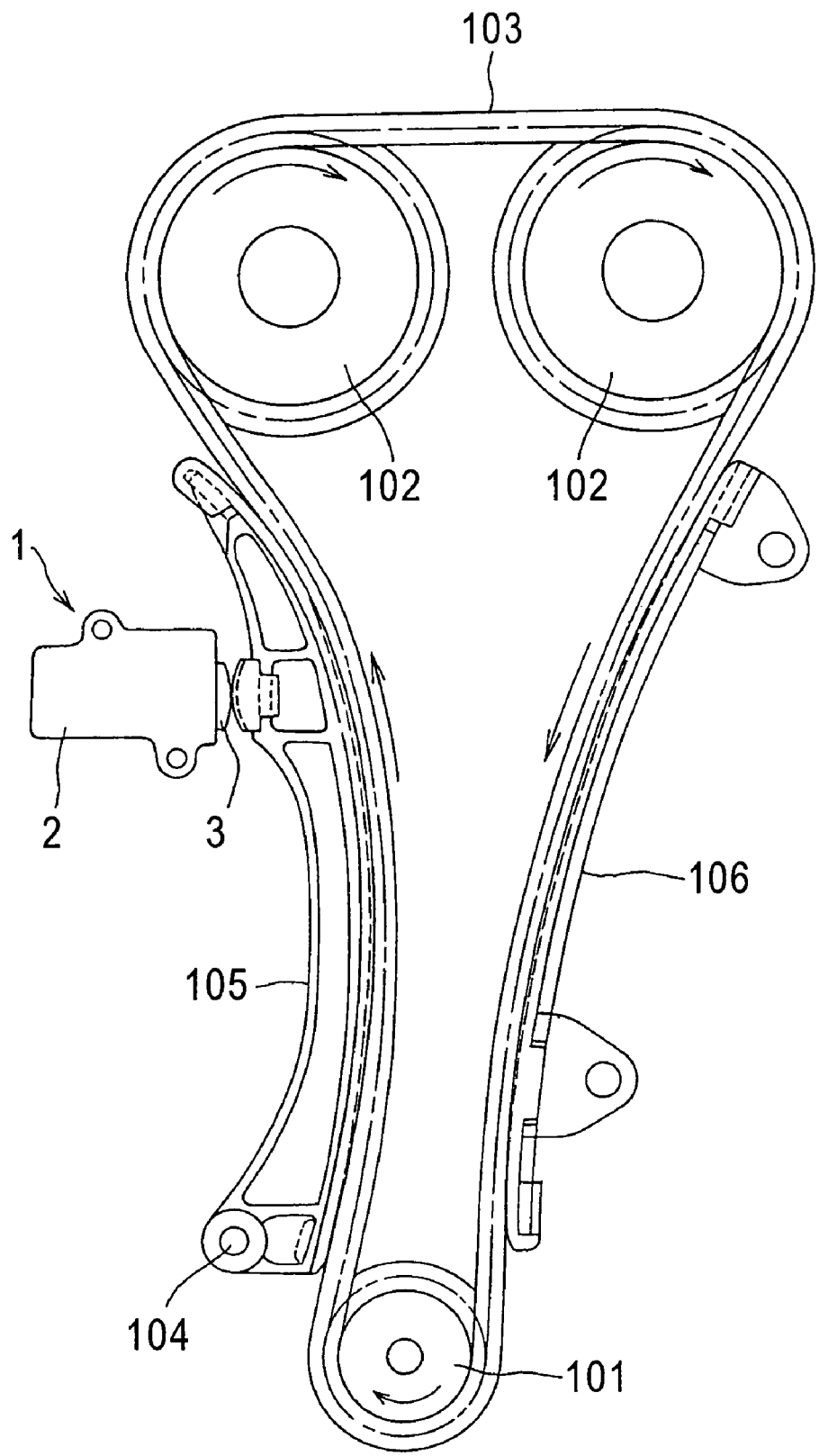
FIG. 1 is a schematic elevational view of the timing transmission of an internal combustion engine, incorporating a hydraulic tensioner according to the invention.

As shown in FIG. 1, a hydraulic tensioner 1 is attached to an engine body on the return (slack) side of a chain driven by a crankshaft sprocket 101 and transmitting rotation to a pair of camshaft sprockets 102. A retractable plunger 3 protrudes from a front end of the tensioner housing 2, imparting tension to the return side of the chain 103, through a lever 105, by pushing the back of the lever. The lever is pivoted on a shaft 104 on the engine body. A guide 106, fixedly attached to the engine body, guides the tension side of the chain.

Figure 2:
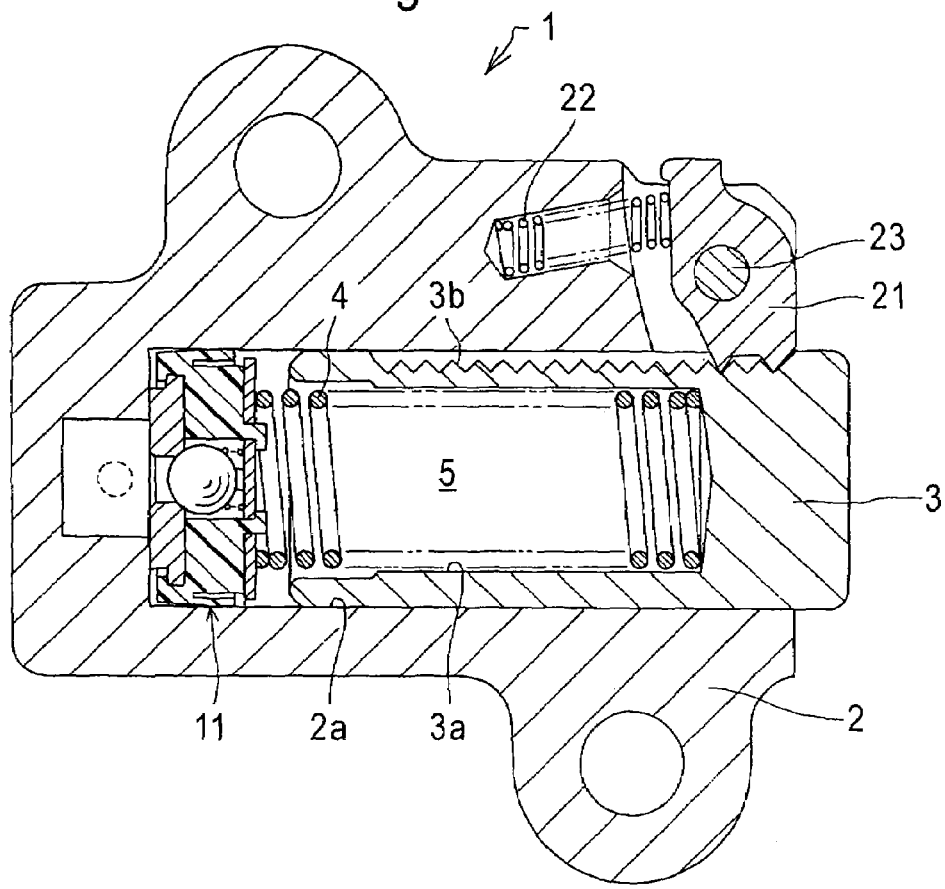
FIG. 2 is a cross-sectional view of a hydraulic tensioner according to the invention.

As shown in FIG. 2, a plunger 3 is slidable in a plunger-receiving hole 2a formed in the housing 2. The plunger itself has an internal hollow space 3a, with an opening at the rear end of the plunger. The hollow space 3a receives a spring 4, which biases the plunger in the protruding direction so that its front end always protrudes outside the plunger-receiving hole 2a. A rack 3b is formed on the outside peripheral surface of the plunger 3, for engagement with a pawl 21. A high pressure oil chamber 5, for containing oil under pressure, is formed by cooperation of the plunger-receiving hole 2a and the hollow portion 3a of the plunger 3. The pressure oil chamber 5 is filled with oil from an external oil supply (not shown) through a check valve assembly 11, located in the plunger receiving hole 2a at one end of the oil chamber 5. The check valve assembly allows causes oil to flow into the oil chamber 5, but blocks reverse flow of oil.

The check valve assembly 11, as shown in FIGS. 3 and 4(A)-4(C), comprises a molded synthetic resin ball guide 12, which guides the movement of a check ball 14, a ball seat 13 attached to the ball guide 12 and having a seating service 13b, a check ball 14, which faces, and can come into engagement with, the seating surface 13b, a check ball biasing cylindrical coil spring 15, which pushes the check ball 14 toward the seating surface 13b, and a retainer 16, also attached to the ball guide 12, for retaining the spring 15 and limiting the stroke of the check ball 14.

Since the ball guide 12 is used in the vicinity of an engine, it must be heat resistant. Therefore the synthetic resin ball guide is preferably molded from a polyamide resin such as nylon 46, nylon 66, or the like. As shown in FIGS. 5(A), 5(C), and 5(D), a check ball guide hole 12a is formed at the center of the ball guide 12, and two oil grooves 12b are formed on the inner circumference of the guide hole 12a. As shown in FIGS. 5(A) and 5(D), a ball seat mounting hole 12c, concentric with the check ball guide hole 12a, is formed on one side of the ball guide 12. Two protrusions 12d, for mounting the retainer 16, are formed on the other side of the ball guide 12, as shown in FIGS. 5(B), 5(C) and 5(D).

Figure 6A:
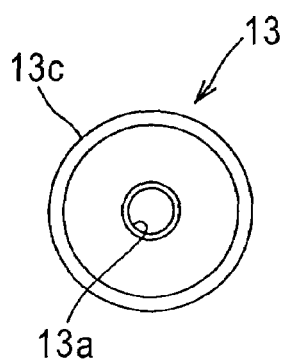
FIGS. 6(A), 6(B), and 6(C) are respectively left side, cross-sectional front, and right side views of a ball seat which constitutes part of the check valve assembly.
Figure 6B:
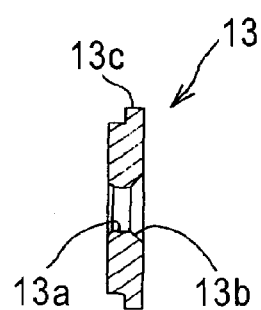
Figure 6C:
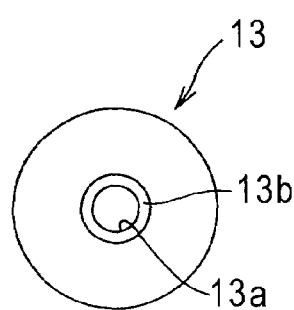

As shown in FIGS. 3 and 6(A)-6(C), the ball seat 13 is generally in the form of a metallic disc. The ball seat 13 has a central oil passage 13a. The seating surface 13b surrounds an opening at one end of the oil passage 13a. As shown in FIG. 6(B), a flange 13c is formed on the outer circumference of the ball seat on the side on which the seating surface 13b is located.

Figure 3:
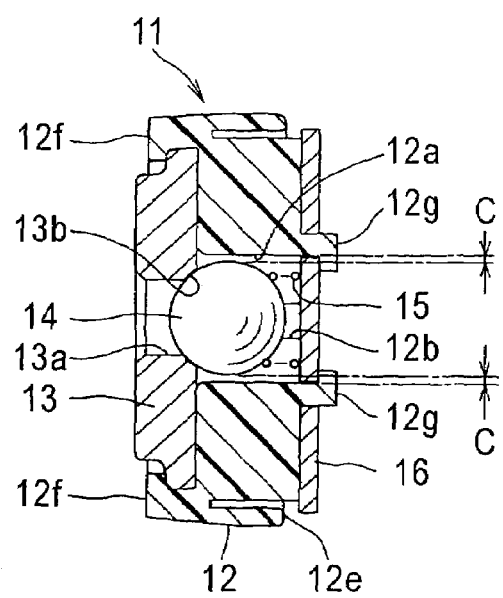
FIG. 3 is a cross-sectional view of a check valve assembly of the tensioner.

The check ball 14 can be composed of any of a variety of materials such as metal, ceramic or synthetic resin, and has a diameter such that it can move in the check ball guide hole 12a. The difference between an inner diameter of the check ball guide hole 12a and the diameter of the check ball should be such that the clearance c, as shown in FIG. 3, between the wall of the guide hole and the check ball is as small as possible while still allowing the check ball 14 to move in the guide hole. (The clearance c is exaggerated in FIG. 3.)

When the check valve is assembled, the spring 15 biases the check ball 14 onto the seating surface 13b of the ball seat 13. However, the spring 15 does not exert a force such as to produce tight contact between the ball and the seat. Nor does it exert a large force on the ball when the ball moves away from the seat and into contact with the flat stroke-limiting surface of the retainer 16.

Figure 7A:
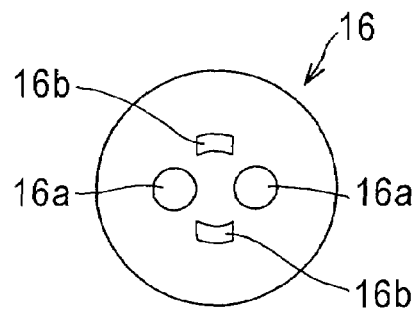
FIGS. 7(A) and 7(B) are respectively left side and front views of a retainer that constitutes a part of the check valve assembly.
Figure 7B:
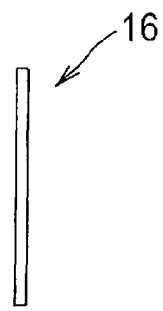

Like the ball seat, the retainer 16 is also made of metal and is generally in the shape of a disc, as shown in FIG. 7(B). As shown in FIG. 7(A), the retainer 16 has two oil passages 16a at symmetrical positions along the direction of a diameter of the retainer 16. Two engagement holes 16b are also provided at positions spaced circumferentially by about 90 degrees from the two oil passages.

In the assembly of the check valve 11, the flange 13c of the ball seat 13 is fitted into the ball seat mounting hole 12c of the ball guide 12. With the flange 13c in place in mounting hole 12c, several portions of the synthetic resin ball guide are heated and crimped over the flange of the ball seat. In the example shown in FIG. 4(A), four parts 12f of the ball guide are crimped by heat fusion onto the flange of the ball seat 13, so that the ball seat is firmly attached to the ball guide 12 by this four crimped portions 12f. After the ball seat 13 is attached to the ball guide 12, the check ball 14 is inserted into the check ball guide hole 12a, and followed by the spring 15. The protrusions 12d of the ball guide 12 are inserted through engagement holes 16b of the retainer 16, and the tips of the protrusions 12d are crimped by heat fusion, as shown in FIG. 3, to hold the retainer 16 in place on the surface of the ball guide opposite to the side to which the ball seat 13 is attached.

After the check valve 11 is assembled as described above, it is inserted into the plunger receiving hole 2a of the housing 2 and press-fit into the hole 2a so that it is situated at the bottom of the hole as shown in FIG. 2. The ball guide 12 preferably has an annular lip 12e on its outer circumference, as shown in FIGS. 3 and 5(D). The elasticity of the annular lip 12e allows the check valve 11 to be press-fit into the plunger-receiving hole easily. Moreover, the annular lip 12e prevents leakage of oil from the oil chamber 5.

A pawl 21, which engages a rack 3b formed on the outer periphery of the plunger 3, is pivotally mounted on the housing 2 by a pivot shaft 23, and biased into engagement with the rack by a spring 22. The rack 3b, pawl 21, biasing spring 22 and pivot shaft 23 prevent retraction of the plunger 3. However, a degree of backlash is permitted by the rack 3b and the pawl 21.

The oil chamber 5 (FIG. 2) is always filled with oil from the outside from an oil pump (not shown) through the check valve assembly 11. When the traveling chain 103 (FIG. 1) loosens, the plunger 3, always biased by the plunger-biasing compression spring 4, protrudes, and the check valve 11 is opened so that oil flows into the oil chamber 5.

When the plunger 3 is pressed into the plunger-receiving hole 2a as a result of an impact, the plunger retracts within the a range of backlash allowed by the rack 3b and the pawl 21. When retraction of the plunger occurs, the pressure of the oil in chamber 5 increases so that the check ball 14 in the check valve assembly 11 is pressed against the seating surface 13b, and reverse flow of oil through the oil passage 13a of the ball seat 13 is prevented. As a result, the oil pressure in chamber 5 is further increased, and oil leaks through a small gap between the outer circumferential surface of the plunger 3 and the inner circumferential surface of the plunger-receiving hole 2a. This leaking oil is discharged outside the housing 2. The flow resistance due to the viscosity of oil damps vibration of the plunger 3 due to the impact force. Excessive retraction of the plunger is prevented by engagement between the rack 3b and the pawl 21.

Upon starting of an engine equipped with a tensioner according to the invention, fluttering of the chain 103 is suppressed by the plunger retraction preventing mechanism even when the hydraulic tensioner 1 is not filled with oil.

When oil is supplied to the tensioner 1, the check ball 14 is separated from the seating surface 13b to open the check valve, whereby oil is supplied to the oil chamber 4 through the oil passage 13a of the ball seat 13. At this time, although the check ball 14 moves, and the check ball-biasing spring 15 is compressed, the stroke of the check ball 14 is limited by the flat back surface of the retainer 16 facing the check ball 14.

When the chain 103 elongates, the engagement between the rack 3b and the pawl 21 is shifted by one tooth so that the plunger 3 always progresses in the protruding direction, following the elongation of the chain 103.

A hydraulic tensioner 1 having a check valve assembly 11 according to the invention exhibits a number of advantages.

First, the synthetic resin ball guide 12 does not receive the impact of the check ball 14, and the ball seat 13 and the retainer 16 are members separate from the synthetic resin ball guide 12. Thus, the shapes of the ball seat 13 and the retainer 16 can be simplified. The requirement for accuracy in the production of parts of the check valve assembly is reduced, assembly is easier, and, as a result the manufacturing cost of the tensioner is reduced.

Second, since the clearance between the check ball and the check ball guide hole is the minimum necessary to allow the ball to move freely along the length of the guide hole, violent movement of the check ball 14 is prevented and the responsiveness of the check ball 14 is enhanced.

Third, the stroke the check ball can be controlled by selection of a ball guide hole having the appropriate axial length. Check valve assemblies 11 having different check ball stroke lengths can be easily distinguished from one another by color coding, which is easily accomplished by the use of different resin colors for different ball guides. In this way, errors resulting from incorporation of a wrong ball guide into a check valve assembly can be avoided.

Fourth, press-fitting of the synthetic resin ball guide into the tensioner housing body by taking advantage of the elasticity of the synthetic resin allows the check valve assembly to be incorporated easily into a hydraulic tensioner. The synthetic resin ball guide can be more easily press-fit into the tensioner housing by taking advantage of the elasticity of an outer circumferential lip formed on the synthetic resin ball guide. Moreover, the annular lip prevents leakage of oil through the gap between the check valve assembly and the tensioner housing.

Fifth, utilization of crimping to mount the ball seat and/or the retainer to the synthetic resin ball guide enhances the ease of assembly of the check valve.

Various modifications can be made to the tensioner described. For example, although a cylindrical coil spring is used as a check ball biasing spring, a conical coil spring may be used instead.

Furthermore, although in the embodiment described, the ball seat and the retainer are attached to the ball guide by crimping, using heat fusion, these components may be attached to the synthetic resin ball guide in other ways, for example by the use of an adhesive.

While the annular lip on the outer circumference of the ball guide is desirable in the preferred embodiment of the invention, many of the advantages of the invention can be realized in embodiments in which the lip is eliminated.

Whereas the hole in the housing that receives the plunger has a constant diameter in the embodiment shown in FIG. 2, the hole can be reduced at its lower end, in which case the check valve assembly may be sized to fit into the reduced diameter portion of the hole.

Finally, the check valve assembly in accordance with the invention can be incorporated into a hydraulic tensioner lacking a rack and pawl mechanism for preventing retraction.

We claim:

1. A hydraulic tensioner comprising:
   a housing having a plunger-receiving hole with an inner circumferential wall;
   a plunger slidably fitting in said plunger-receiving hole, and having one end protruding in a protruding direction from the housing;
   a compression spring biasing the plunger in the protruding direction;
   a oil chamber, for containing oil under pressure, defined by said plunger-receiving hole and said plunger;
   a passage in the housing for flow of oil from outside the housing into said oil chamber; and
   a check valve assembly incorporated into the housing, said check valve assembly allowing oil to flow through said passage into said oil chamber but blocking reverse flow of oil through said passage;
   in which said check valve assembly comprises:
   a check ball;
   a ball seat;
   a synthetic resin ball guide attached to said ball seat, said ball guide having a guide hole in which said check ball is movable toward and away from said ball seat;
   a biasing spring urging said check ball toward engaged relationship with said ball seat;
   a retainer, attached to said synthetic resin ball guide, said biasing spring being disposed between said retainer and said check ball, and said retainer limiting movement of said check ball away from said ball seat;
   said guide hole having a wall with an inner circumferential surface and at least one groove formed in said wall for permitting flow of oil past said check ball, the guide hole and the check ball having a clearance between them just sufficient to allow movement of the check ball in said guide hole into and out of engagement with the ball seat;

in which said synthetic resin ball guide is press fit into the housing and the check valve assembly is thereby incorporated into the housing, and in which said synthetic resin ball guide has an outer circumference with an annular lip formed thereon, said annular lip resiliently engaging the inner circumferential wall of the plunger-receiving hole.

2. A hydraulic tensioner according to claim 1, in which said synthetic resin ball seat is secured to said ball guide by at least one crimped portion of said ball guide.

3. A hydraulic tensioner according to claim 1, in which said retainer is secured to an end surface of said synthetic resin ball guide by at least one crimped portion of said ball guide.

4. A hydraulic tensioner according to claim 2, in which said retainer is secured to an end surface of said synthetic resin ball guide by at least one crimped portion of said ball guide.

* * * * *